May 29, 1928.
W. A. CALDWELL
SIGNAL
Filed July 27, 1926
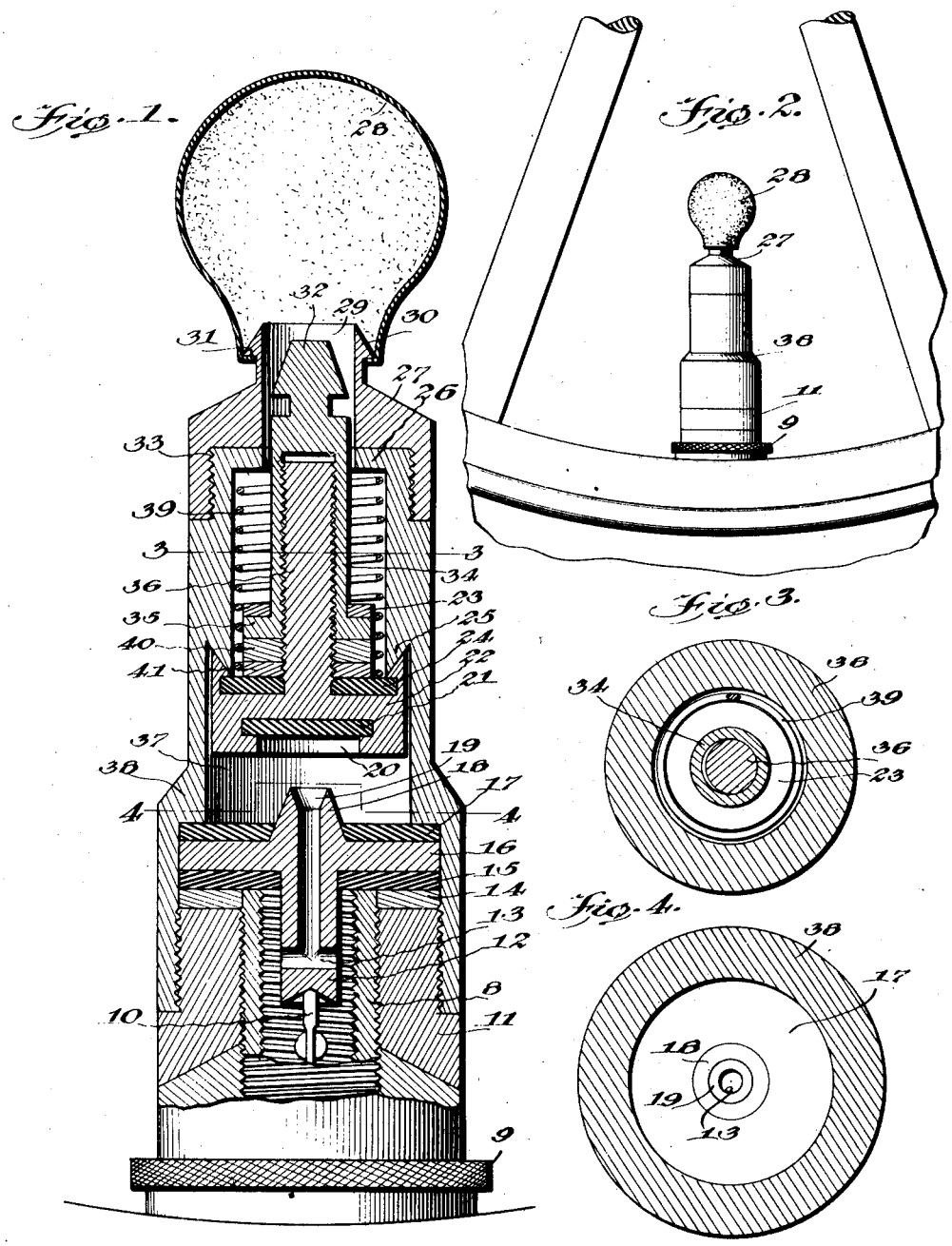
INVENTOR
W. A. Caldwell,
BY
ATTORNEY Patented May 29, 1928.

1,671,852

UNITED STATES PATENT OFFICE.

WILLIAM ADDISON CALDWELL, OF MANILA, PHILIPPINE ISLANDS, ASSIGNOR OF ONE-FOURTH TO JACOB McCALISTER, OF LIMAY, PHILIPPINE ISLANDS.

SIGNAL.

Application filed July 27, 1926. Serial No. 125,276.

This invention relates to signals for pneumatic tires.

It is well known that pneumatic tires are frequently deflated by a gradual loss of air from the inner tube because of a puncture therein, or because of a faulty valve, or because the aperture where the valve stem passes through the wall of the inner tube has not been completely closed. This results in many instances in serious damage to the outer casing, especially so if the automobile, motorcycle, or other vehicle with which the tire is associated is being used for transportation purposes and at the time is being propelled rapidly.

It is also well known that automobiles are frequently allowed to leave the garage and begin the day's work with a deficient air pressure in one or more of the inner tubes because of the trouble and delay involved in testing the pressure with the instruments now in use. This also results in many instances in serious damage to the outer casings, especially if they are of the balloon type.

It is an object of the present invention to provide a warning signal in advance of the complete deflation of the tire so that the vehicle may be stopped and the tube replaced or repaired before the outer casing has been damaged or forced abruptly from the wheel with a consequent destruction of the inner tube.

A second object of the invention is to provide an audible, automatically operated signal which is controlled by a spring in opposition to the air pressure in the inner tube for giving a timely warning of the loss of air therefrom.

A third object of the invention is to provide a visible, automatically operated signal which is controlled by a spring in opposition to the air pressure in the inner tube for indicating the status of the air pressure with reference to a predetermined minimum hereinafter referred to as the safety point.

The invention will be best understood from a consideration of the following detailed description in view of the accompanying drawings forming a part of the specification: nevertheless, it is to be understood that the invention is not confined to the disclosure, being susceptible of such changes and modifications as shall define no material departure from the salient features of the invention as described in the appended claims.

In the drawings:

Figure 1 is a vertical section of an automatic, pneumatic tire signal constructed in accordance with the principles of my invention.

Figure 2 is a view in elevation of the signal applied to a wheel.

Figure 3 is a horizontal section taken along the line 3—3 of Fig. 1.

Figure 4 is a horizontal section taken along the line 4—4 of Fig. 1.

Referring more particularly to the drawings, 7 designates the felly of a wheel having the usual opening through which projects the threaded nipple 8 of the usual valve of an inner tube. A nut 9 is provided for locking the nipple to the felly. A valve needle or stem 10 is mounted in the nipple for controlling the admission of air under pressure into the inner tube.

The nut 11 has internal threads which engage the threads on the nipple 8 and external threads which are engaged by the lower internally threaded end of a barrel 38.

The holder 27 is threaded onto the barrel 38 by means of the threads 33. The end of the holder is tapered back to the shoulder 31 to receive and accommodate the stem of the small cap or balloon 28 of thin rubber which covers it.

The valve head 22 fits the chamber 37 of the barrel 38 loosely. A sleeve 34 forming an extension of the valve stem 36 is threaded thereon and terminates in a round knob 32. The extension 34 of the valve stem is also embraced by a spring 39 which has its upper end in engagement with a flange 26 at the top of the barrel 38 while its other end engages the washer 23 on top of the circular flange 35 at the bottom of the sleeve 34 on the valve stem. The rubber pad 24 is embedded in the top of the valve head 22 and is secured thereto by the nut 40. Between the nut 40 and the valve head 22 is interposed a washer 41. The rubber pad 21 is embedded in the bottom face of the valve head 22. Near the middle of the barrel 38 the beveled annular shoulder 25 forms a valve seat.

In the lower end of the chamber 37 of the barrel 38, a metal washer 14, a leather washer 15, a metal disc 16, and a second leather washer 17 are mounted above the upper inner end of the nut 11. From the bottom of the disc 16 projects a closed cylinder 12 and from the top of the disc 16 projects a cone 18. The inner end of the cylinder 12 is countersunk to receive the head of the needle 10 and the cone 18 is truncated to form a second valve seat and countersunk to form a mouth for the angular canal or conduit 13 which passes therethrough and connects the chamber 37 with the passage in the valve nipple 8.

The operation of my device is as follows:

The holder 27 is unscrewed from its place on top of the barrel 38. The device is then screwed onto the nipple 8 of the inflated tire by means of the threads in the nut 11. The projection 12 on the disc 16 will be pressed against the needle 10 in the nipple of the valve and force it downwardly thus opening the valve for the passage of air from the inner tube. The knob 32 on top of the sleeve 34 on the valve stem is grasped between the fingers and the valve head 22 elevated until it reaches the valve seat 25 and the rubber pad 24 is wedged between the beveled edge thereof and the top face of the valve head in which position it will be held by the continuous air pressure from the inner tube acting through the canal 13 against the resistance of the spring 39, thus effectively closing the chamber 37 against the escape of air from the inner tube. The air which will escape past the loose fitting valve head 22 while in transit from its seat on top of the cone 18 to its seat against the beveled edge of the shoulder 25 will emit a hissing sound thus indicating that the valve of the inner tube has been properly opened. The holder 27 with the rubber cap or balloon 28 stretched over the top thereof is then screwed back in its place on top of the barrel 38.

The device is now set for action and so long as the air pressure in the inner tube remains above the predetermined safety point, the device will remain set, the fact being evidenced or indicated by the continued presence of the little rubber balloon intact on top of the holder 31; but when the air in the inner tube for any reason escapes, the air pressure in the chamber 37 will be decreased thereby permitting the spring 39 to drive the valve head 22 downwards. The air from the inner tube will then escape through the canal 13, through the chamber 37 past the loose fitting valve head 22 and the rubber pad 24, through the hole in the top of the barrel 38 which the sleeve 34 on the valve stem 36 fits but loosely, through the canal 29 in the holder 27 into the balloon 28 which is thereby inflated until it explodes with an audible report. The spring 39 is of such length that it will still exert pressure on the valve head 22 after it has reached the bottom of the chamber 37 and is seated on top of the cone 18. The device will therefore be effectively closed against the further loss of air after the warning signal has been produced.

As the valve head 22 fits loosely in the chamber 37, it may be moved up or down without friction; and because of the fine edge to which the shoulder 25 and the wall of the cone 18 have been reduced, mere contact with the rubber pads 24 and 21 is sufficient to close the device against the escape of air. Consequently, given the desired minimum pressure which is to operate as the safety point, the area of the circle formed by the sharp inner edge of the shoulder 25 and the area of the top of cone 18, the force which must be exerted by the spring 39 to discharge the device after it has been set or to close it after it has been discharged can be determined with exactness, due allowance being made for the escape of a sufficient quantity of air to explode the small rubber balloon; and the former can be quickly and easily regulated from without by screwing the prolongation 34 of the valve stem with the flange 35 thereon up or down on the valve stem 36 thus increasing or decreasing the tension of the spring 39; the latter may be regulated in the same manner as the former or by increasing or decreasing the altitude of the cone 18 or by increasing or decreasing the diameter of the orifice in the top thereof or by a combination of all three methods always making due allowance for the escape of a sufficient quantity of air to explode the small rubber balloon. The device is therefore capable of quick and easy adjustment to any desired pressure and can be made to function by a small variation in the air pressure in the inner tube from the safety point.

Having now particularly described and ascertained the nature of my invention and in what manner the same is to be operated, what is claimed is:

1. In a device of the character described, the combination of a valve stem, an air chamber, a valve in the stem normally held closed by air pressure in the chamber, a cylinder secured to the valve stem, a tubular member supported in the cylinder and placing the valve stem in communication with said cylinder, a double acting valve slidably mounted in the cylinder and adapted at times to engage one end of the tubular member for preventing the escape of air from the air chamber to the cylinder, a spring for maintaining the double acting valve closed in one position of the valve against the action of the air in said chamber, a valve seat in the cylinder adapted to be engaged by the double acting valve and maintained in seated position by air pressure from the air chamber, the tubular member being adapted to engage the valve in the stem and maintain said valve open to permit air to pass through the tubular member and force the double acting valve on its seat in the cylinder to prevent the escape of air from the cylinder and against the action of the spring, an elastic cap secured to the cylinder and in open communication therewith whereby when the spring forces the double acting valve away from its seat in the cylinder, air pressure will be admitted to the elastic cap to cause rupture of the same.

2. In a device of the character described, the combination of a valve stem, an air chamber, a valve in the stem normally held closed by air pressure in the chamber, a cylinder secured to the valve stem, a tubular member supported in the cylinder and placing the valve stem in communication with said cylinder, a double acting valve slidably mounted in the cylinder and adapted at times to engage one end of the tubular member for preventing the escape of air from the air chamber to the cylinder, a spring for maintaining the double acting valve closed in one position of the valve against the action of the air in said chamber, a valve seat in the cylinder adapted to be engaged by the double acting valve and maintained in seated position by air pressure from the air chamber, the tubular member being adapted to engage the valve in the stem and maintain said valve open to permit air to pass through the tubular member and force the double acting valve on its seat in the cylinder to prevent the escape of air from the cylinder and against the action of the spring, an audible signal connected to the signal and in open communication therewith so that when the spring forces the double acting valve from the seat in the cylinder air pressure will cause said signal to emit a sound.

WILLIAM ADDISON CALDWELL.